United States Patent
Wang

(10) Patent No.: US 8,542,699 B2
(45) Date of Patent: Sep. 24, 2013

(54) METHODS AND SYSTEMS FOR CONTENT SYNCHRONIZATION IN WIRELESS COMMUNICATION NETWORKS

(75) Inventor: Chun-Yen Wang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 870 days.

(21) Appl. No.: 12/509,659

(22) Filed: Jul. 27, 2009

(65) Prior Publication Data

US 2010/0027455 A1 Feb. 4, 2010

Related U.S. Application Data

(60) Provisional application No. 61/085,150, filed on Jul. 31, 2008.

(51) Int. Cl.
*H04H 20/71* (2008.01)
*H04J 3/17* (2006.01)
*H04L 12/26* (2006.01)
*H04H 20/00* (2008.01)

(52) U.S. Cl.
CPC .......... *H04L 12/26* (2013.01); *H04H 20/00* (2013.01)
USPC .......................................... 370/432; 370/310

(58) Field of Classification Search
USPC ........................................ 370/310, 432, 312
See application file for complete search history.

(56) References Cited

U.S. PATENT DOCUMENTS

| | | | |
|---|---|---|---|
| 6,778,493 B1 | 8/2004 | Ishii | |
| 2008/0311949 A1 | 12/2008 | Koskinen et al. | |
| 2010/0110958 A1* | 5/2010 | Racz et al. | 370/312 |
| 2011/0044225 A1* | 2/2011 | Rinne et al. | 370/312 |
| 2011/0085488 A1* | 4/2011 | Widegren | 370/312 |

OTHER PUBLICATIONS

3GPP TSG-RAN WG3 #55, "Details of eMBMS Content Synchronization", St. Louis, USA, Feb. 12-16, 2007.

* cited by examiner

*Primary Examiner* — Paul H Masur
(74) *Attorney, Agent, or Firm* — Finnegan, Henderson, Farabow, Garrett & Dunner, LLP

(57) ABSTRACT

In a method for content synchronization in a wireless network, a first data packet communicated in a multicast or broadcast service is received over a first communication channel. A primary counter value is added to the first data packet. The primary counter value is indicative of a total size of data packets sent over a second communication channel to a base station within a period of time. A secondary counter value is added to the first data packet if the first data packet has a timestamp later than a scheduling time associated with a scheduling interval for transmitting data packets. An updated first data packet is sent over the second communication channel to the base station, the updated first data packet having the first data packet received including the primary counter and the secondary counter.

10 Claims, 8 Drawing Sheets

METHODS AND SYSTEMS FOR CONTENT SYNCHRONIZATION IN WIRELESS COMMUNICATION NETWORKS

CROSS REFERENCES TO RELATED APPLICATIONS

This application claims the benefit of priority from U.S. Provisional Application No. 61/085,150, filed Jul. 31, 2008, the entire contents of which is incorporated herein by reference.

TECHNICAL FIELD

Embodiments disclosed herein relate to wireless communications and, more particularly, to methods and systems for content synchronization in a wireless communication network.

BACKGROUND

Wireless communication networks, such as Multicast/Broadcast Single-Frequency Network (MBSFN) may use an IP datacast service to provide the same content to many mobile stations simultaneously. Content may be transmitted from multiple base stations from multiple geographically dispersed cells at a synchronized timing. Thus, a mobile station located in any one of the multiple cells may operate as though it receives content from one large MBSFN cell.

Operationally, providing one large MBSFN cell may provide improved network performance. For example, MBSFN transmissions received by mobiles stations within the MBSFN cell may have high signal strength, offering better-received signals that may be more easily decoded. Further, multiple transmissions may provide diversity of signal gains, and reduce inter-cell interference. Other benefits may include reducing or eliminating the need to hand-off transmission from multiple base stations as a mobile station travels across multiple cells.

Time-synchronized transmission, however, may pose operational challenges as well. Specifically, ensuring each base station receives the same input corresponding to identical content may be difficult. Because each base station is geographically dispersed within the MBSFN cell, content received from a distribution system may arrive at each base station at different times. Thus, ensuring that each base station contributing to the MBSFN transmission has the same content at a given time may be problematic. Further, multicast and broadcast service transmission (MBS) packets may get lost during the transmission between the distribution system and any one of the base stations. To maintain time-synchronized transmission, MBS packet losses should be detectable, particularly in cases of consecutive MBS packet losses. Therefore, it may be desirable for some applications to overcome MBS packet transmission latency, detect packet loss, and/or resume MBSFN transmission even in cases of consecutive MBS packet losses.

BRIEF SUMMARY

Consistent with the disclosed embodiments, a method for content synchronization in a wireless network is provided. In some embodiments, a first data packet communicated in a multicast or broadcast service is received over a first communication channel. A primary counter value is added to the first data packet. In some embodiments, the primary counter value may be indicative of a total size of data packets sent over a second communication channel to a base station within a period of time. A secondary counter value is added to the first data packet if the first data packet has a timestamp later than a scheduling time. In some embodiments, the scheduling time may be associated with a scheduling interval for transmitting data packets. An updated first data packet is sent over the second communication channel to the base station. In some embodiments, the updated first data packet includes the first data packet received including the primary counter and the secondary counter.

Further in accordance with the disclosed embodiments, another method for content synchronization in a wireless network is provided. In some embodiments, a buffer status of a buffer coupled with a base station is determined. The buffer status may be accessed to obtain a first number of data packets received by the buffer prior to a scheduling time. In some embodiments, the scheduling time may be associated with a scheduling interval for transmitting data packets. At the scheduling time, a second number of data packets to transmit over a communication channel based on at least one of the buffer status and a channel capacity of the communication channel over which the data packets are to be transmitted may be determined. During a scheduling interval following the scheduling time, the second number of data packets may be transmitted based on a scheduling algorithm and in response to the determining of the second number of the data packets to be transmitted.

Further in accordance with the disclosed embodiments, a method of performing content synchronization is provided. In some embodiments, a determination of whether a buffer includes a data packet with a timestamp greater than a scheduling time is made. In response to a positive determination result, a first data packet having the timestamp later than the scheduling time is identified. A first difference between a primary counter value of the first data packet, a secondary counter value of the first data packet, and a total transmitted value is calculated. During a next scheduling interval, all data packets stored in the buffer having the timestamp less than or equal to the scheduling time are transmitted when the calculated first difference is less than or equal to a total radio resource capacity. Based on the calculated first difference, the total transmitted value is updated.

Additional descriptions of the disclosed embodiments will be set forth in part in the description which follows, and in part will be obvious from the description, or may be learned by practice of the embodiments.

It is to be understood that both the foregoing general description and the following detailed description are exemplary and explanatory only and are not restrictive of the disclosed embodiments, as claimed.

BRIEF DESCRIPTION OF THE DRAWINGS

The foregoing summary, as well as the following detailed description of the disclosed embodiments, will be better understood when read in conjunction with the appended drawings. For the purpose of illustrating the disclosed embodiments, there are shown in the drawings that are presently preferred. It should be understood however, that the embodiments are not limited to the precise arrangement and instrumentalities shown.

In the drawings.

DETAILED DESCRIPTION OF THE DISCLOSED EMBODIMENTS

Reference will now be made in detail to disclosed embodiments illustrated in the accompanying drawings. Wherever possible, the same reference numbers will be used throughout the drawings to refer to the same or like portions. It should be noted that the drawings are in greatly simplified form and are not to precise scale.

Figure 1:
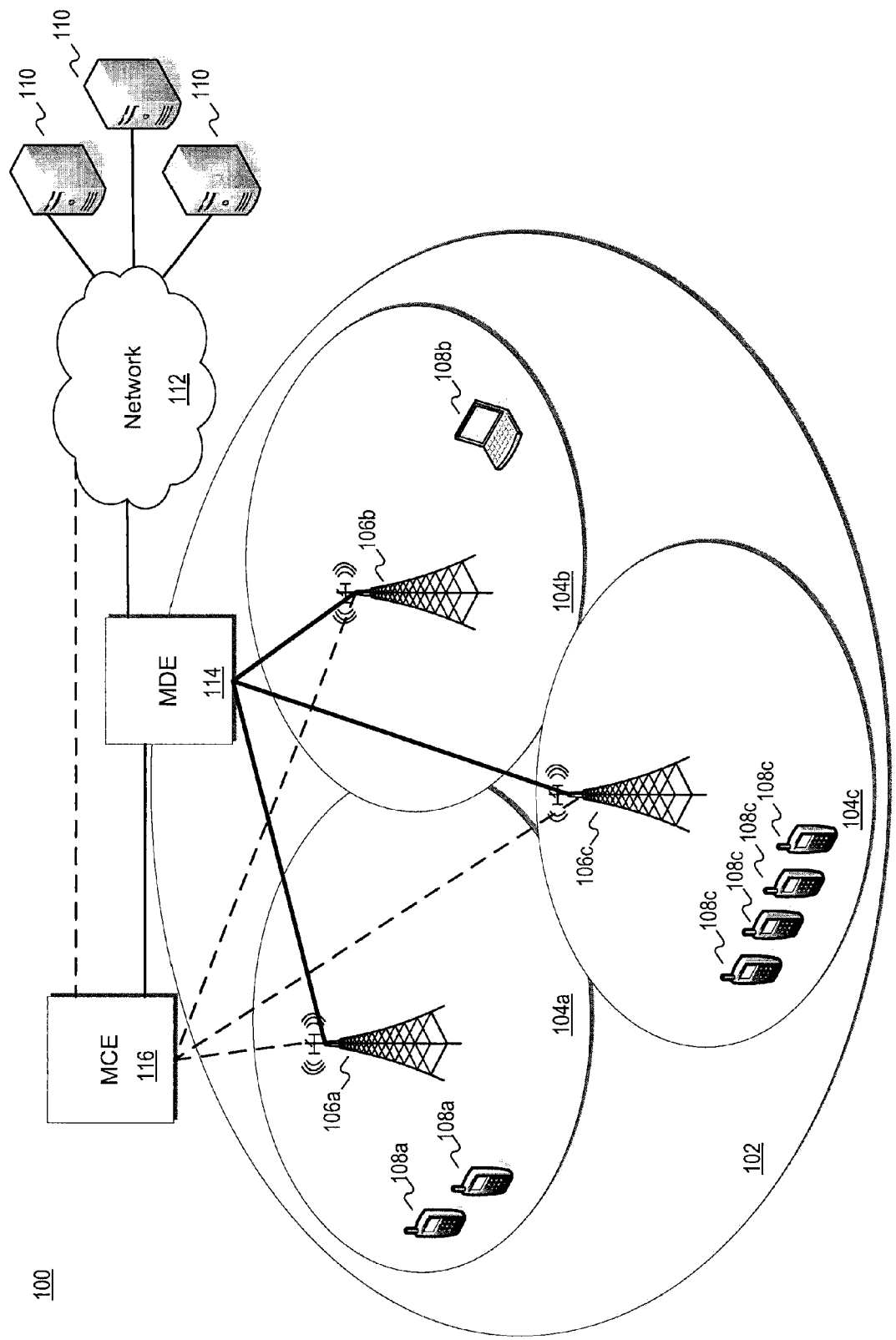
FIG. 1 illustrates a diagram of an exemplary logical MBSFN network architecture consistent with some embodiments.

FIG. 1 is a diagram illustrating components of an exemplary logical MBSFN network architecture 100. By way of example, logical network architecture 100 may be implemented to create a wireless communication network, such as a Multicast/Broadcast Single-Frequency Network (MBSFN), using one or more communication technologies. Those communication technologies may include, but are not limited to, one or more of code division multiple access (CDMA), wideband code division multiple access (WCDMA), wireless local area network (WLAN), worldwide interoperability for microwave access (WiMAX), and orthogonal frequency-division multiplexing (OFDM). By using one or more of these communication technologies, base stations 106a-c and each of mobile stations 108a-c may be operatively coupled (such as communicatively coupled by wireless communication signals) to transmit and receive voice and data information. In the exemplary embodiment of FIG. 1, base stations 106a-c and mobile stations 108a-c may be coupled to other systems (not shown) or target groups (not shown) via a wired or wireless communication network (not shown), or may directly access other systems, users groups, data storages, or other network applications.

Logical network architecture 100 may include MBSFN target area 102, which may include MBSFN cells 104a-c. Each of MBSFN cell 104a-c may include a base station coupled to communicate with one or more mobile stations located within a geographic area. The geographic area may be defined based on one or more factors, such as the transmission range of the base station, receiver sensitivity of the mobile station, and the extent of environmental and/or electromechanical interference sources within MBSFN target area 102.

In some embodiments, multiple base stations may be configured to operate collectively in a logical MBSFN architecture. For example, as shown in FIG. 1, and without limitation, base stations 106a-c may operate collectively to transmit MBS packets to mobile stations 108a-c within MBSFN target area 102. In operation, MBS packets may be generated by content provider system 110 that is operatively coupled to network 112. In some embodiments, content provider system 110 may be a single or multi-processor computing device configured specifically to generate MBS packets. For example, content provider system 110 may include one or more processors that may be selectively activated or reconfigured by a computer program or computer-readable storage medium with programmed instructions. Content provider system 110 may also include one or more application servers configured to generate streaming media, voice, or other data services formatted as MBS packets. For example, content provider system 110 may be a video on demand (VOD) server or other systems providing video, music, or other content. Content provider system 110 may also be a distributed computing system, as shown in FIG. 1, having multiple computing devices.

Though depicted as a server, content provider system 110 may also include generally any system configured to store or allow the access of computer-readable data. For example, content provider 110 may be a database. In some embodiments, the database may be a hardware system comprising physical computer-readable storage media and input and/or output devices configured to receive and provide access to tables, lists, or other data structures. Configured as a hardware system, the database may include one or more processors and/or displays. In some embodiments, content provider system 110 may be directly or indirectly coupled to network 112 through a communication interface. The communication interface may operatively connect content provider system 110 to network 112 via a wired and/or wireless communications link. Network 112 may be a shared, public, or private network, and may be implemented through any suitable combination of wired and/or wireless communication networks. Furthermore, network 112 may include a local area network (LAN), a wide area network (WAN), an intranet, and/or the Internet.

Coupled to receive MBS packets from network 112, MBS distribution entity (MDE) 114 and MBS coordination entity (MCE) 116 may operate together to generate a MBSFN transmission. MDE 114, for example, may distribute MBS packets received from content provider system 110 to one or more base stations 106a-c over a communication channel. MCE 116 may provide management functionality associated with distributing the MBS packets over the communication channel. For example, MCE 116 may manage and allocate radio resources to enable base stations 106a-c to transmit the same content using the same frequency or channel at the same time. In operation, this may be performed by allocating MBSFN subframes to multiple base stations to send identical content using the same radio subframes.

Though depicted as separate functional units, MDE 114 and MCE 116 may be implemented as logical functional components. Further, in some embodiments, MDE 114 and MCE 116 may be implemented in one or more network components or network management systems. For example, in a WiMAX network architecture, MDE 114 and MCE 116 may be implement together in the Access Service Network (ASN) gateway. Alternatively, MDE 114 may be implemented in the ASN gateway, while MCE 116 may be implemented in one or more base stations 106a-c. In other network architectures, such as those having a wireless system with relay station assistance, MDE 114 and/or MCE 116 may be implemented in one or more of base stations 106a-c to coordinate downstream relay stations to transmit the same data at the same time.

As shown in FIG. 1, base station 106a-c may be operatively coupled to receive MBS packets from MDE 114 and control information from MCE 116 over one or more communication channels. One or more of base stations 106a-c may be operatively coupled to one or more of MBSFN cells 104a-c within MBSFN target area 102. Although a specific numbers of base stations, mobile stations, and MBSFN cells are shown in FIG. 1, FIG. 1 is exemplary and any number or type of base stations, mobile stations, and MBSFN cells may be provided. Furthermore, the functions provided by one or more devices of network 100 may be combined, substituted, or re-allocated among various devices. Each of base stations 106a-c may include the same, similar, or different components, appropriate apparatus, or systems that facilitates communication between a mobile station and a network. For example, in some embodiments, base stations 106a-c may each include a wireless communication device installed at a fixed location to create a cell or defined geographic region of network coverage, such as a Node-B, an eNode B, a base transceiver system (BTS), an access point, a home base station, etc. In other embodiments, one or more of base stations 106a-c may be a relay station, an intermediate node, or an intermediary. Base stations 106a-c may each include any appropriate type of wireless or radio base station, such as a land-based communication base station or a satellite-based communication base station. Base stations 106a-c may each include any appropriate type voice, data, and/or integrated voice and data communication equipment to provide high speed data and/or voice communications. In other embodiments, any other type of base station or equivalent thereof may be used.

Mobile stations 108a-c may be any type of device for communicating with any one of base stations 106a-c. For example, mobile stations 108a-c may be a mobile communication device, or any other appropriate computing platform or device capable of exchanging data and/or voice information with one or more of base stations 106a-c. For example, mobile stations 108a-c may include servers, clients, desktop computers, laptop computers, network computers, workstations, personal digital assistants (PDA), tablet PCs, scanners, telephony devices, pagers, cameras, musical devices, etc. In addition, mobile station may be a fixed computing device, like mobile station 108b, operating in a mobile environment, such as, for example, a bus, a train, an airplane, a boat, a car, etc. In some embodiments, any one of mobile stations 108a-c may be coupled to communicate with any one of base station 106a-c using any of the various communication standards supporting mobile communication devices. Mobile stations 108a-c may be configured to communicate with other mobile stations directly or indirectly via any one of base stations 106a-c or other base stations or computing systems using wired or wireless communication methods.

Figure 2:
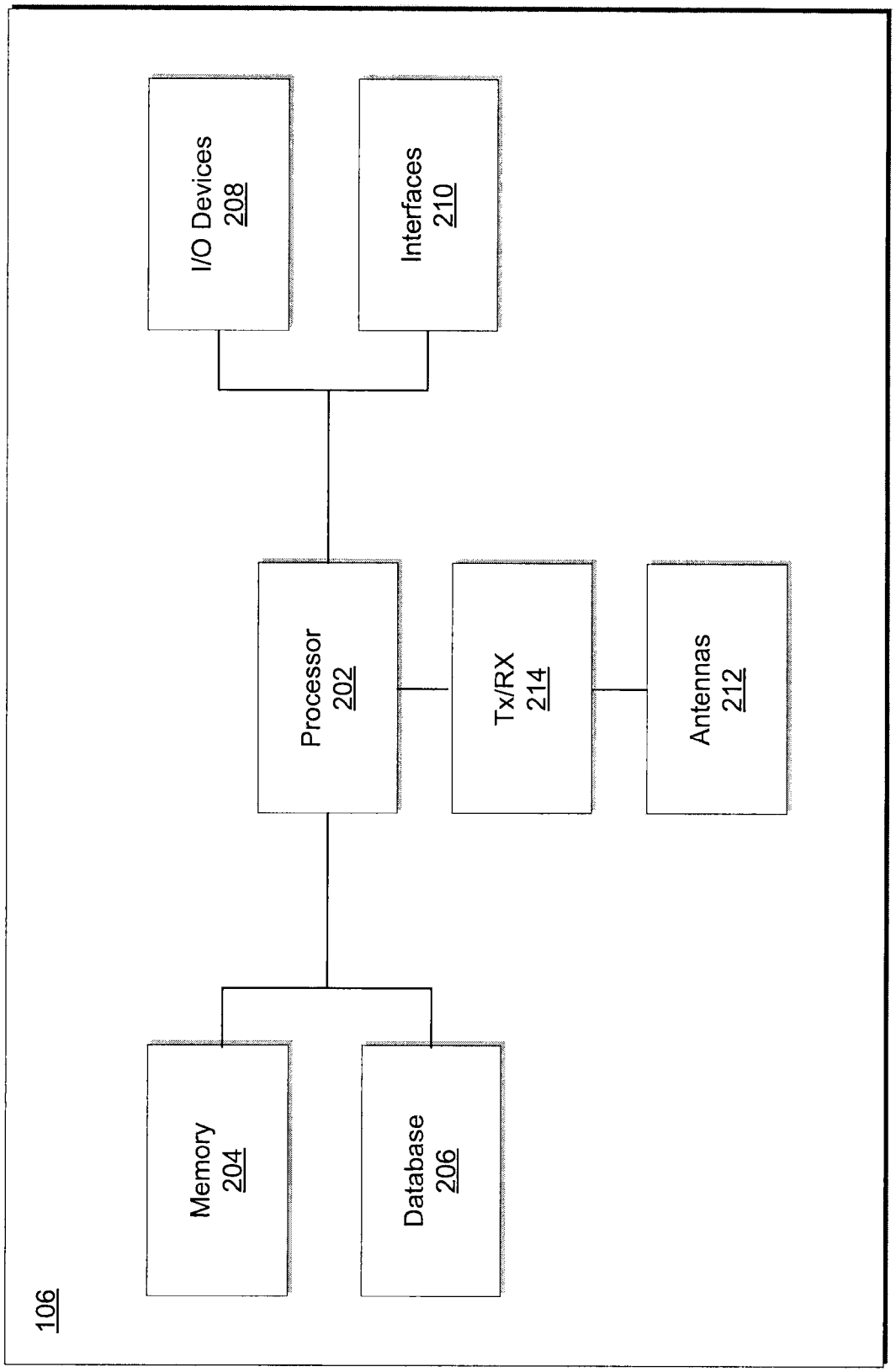
FIG. 2 illustrates a block diagram of an exemplary base station consistent with some embodiments.

FIG. 2 illustrates a block diagram of an exemplary base station 106. As shown in FIG. 2, base station 106 may include one or more of the following components: at least one processor 202 configured to execute computer program instructions to perform various processes and methods, memory 204 configured to access and store information and computer program instructions, database 206 to store tables, lists, or other data structures, I/O devices 208, interfaces 210, antennas 212, and transceiver 214.

Processor 202 may be a general purpose processor, application specific integrated circuit (ASIC), embedded processor, field programmable gate array (FPGA), microcontroller, or other like device. Processor 202 may act upon instructions and data to process data output from transceiver 214, I/O devices 208, interfaces 210, or other components that are coupled to processor 202. In some embodiments, processor 202 may be coupled to exchange data or commands with memory 204. For example, processor 202 may contain code operable to maintain and transmit information stored in a buffer associated with memory 204. In other embodiments, processor 202 can exchange data, including control information and instructions with other devices or functional modules coupled to any one of base stations 106a-c.

Memory 204 may be one or more memory devices that store data as well as software and may also include, for example, one or more of volatile or non volatile semiconductor memories, magnetic storage, or optical storage. Memory 204 may be a computer-readable storage medium. Memory 204 may be distributed. That is, portions of memory 204 may be removable or non-removable. In some embodiments, memory 204 may be implemented in a network (not shown) coupled to communicate with base station 106. Memory 204 may be arranged as a buffer configured to maintain MBS packets received from content provided system 110 for transmission to mobile stations 108a-c.

Database 206 may be a structured collection of tables, lists, or other data structures. Database 206 may be a database management system (DBMS), a relational database management system, an object-oriented database management system, or similar database system. As such, the structure may be organized as a relational database or an object-oriented database. In other embodiments, database 206 may be a hardware system comprising physical computer-readable storage media and input and/or output devices configured to receive and provide access to tables, lists, or other data structures. Further, hardware system database 206 may include one or more processors and/or displays.

I/O devices 208 may be one or more of a mouse, stylus, keyboard, audio input/output device, imaging device, printing device, display device, sensor, wireless transceiver, or other similar device. I/O devices 208 may also include devices that provide data and instructions to memory 204 and/or processor 202.

Interfaces 210 may include external interface ports, such as USB, Ethernet, FireWire®, and wireless communication protocols. Interfaces 210 may also include a graphical user interface, or other humanly perceivable interfaces configured to present data, including but not limited to, a portable media device, traditional mobile phone, smart phone, navigation device, or other computing device. Base stations 106a-c may be operatively connected to network 112 via one or more wired and/or wireless communications channels using interface 210.

Transceiver 214 may include any appropriate type of transmitter and receiver to transmit and receive voice and/or data from one of base stations 106a-c to mobile stations 108a-c and other devices assigned to MBSFN target area 102. In some embodiment, transceiver 214 may include one or a combination of desired functional component(s) and processor(s) to encode/decode, modulate/demodulate, and to perform other wireless communication channel-related functions. Transceiver 214 may be coupled to communicate with antenna 212 to transmit and receive voice and/or data in one of various transmission modes. Transmission modes may include, for example, multi-cell point-to-multipoint (MC-PTM), like MBSFN. Alternatively or additionally, transmission modes may include point-to-point (PTP) and single-cell point-to-multipoint (SC-PTM). Antenna 212 may be a single antenna or an antenna array.

Figure 3:
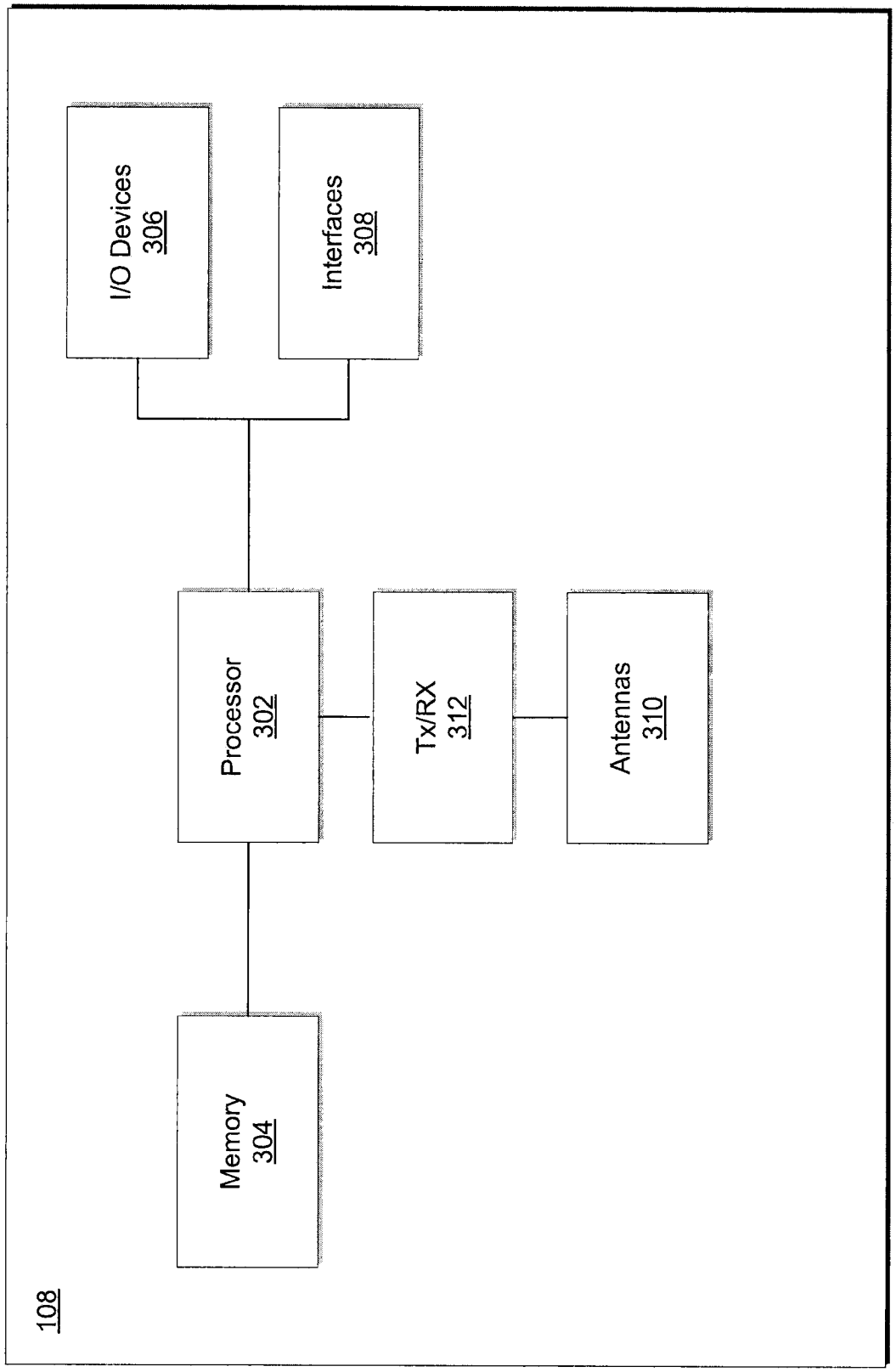
FIG. 3 illustrates a block diagram of an exemplary mobile station consistent with some embodiments.

FIG. 3 illustrates a block diagram of an exemplary mobile station 108. As shown in FIG. 3, mobile station 108 may include one or more of the following components: at least one processor 302 configured to execute computer program instructions to perform various processes and methods, memory 304 configured to access and store information and computer program instructions, I/O devices 306, interfaces 308, antennas 310, and transceiver 312.

Processor 302 may be a general purpose processor, application specific integrated circuit (ASIC), embedded processor, field programmable gate array (FPGA), microcontroller, or other like device. Processor 302 may act upon instructions and data to process data output from transceiver 312, I/O devices 306, interfaces 308, or other components that are coupled to processor 302. In some embodiments, processor 302 may be coupled to exchange data or commands with memory 304. For example, processor 302 may contain code operable to execute instructions that provides one or more graphical user interfaces (GUIs) for interacting with network resources and/or accessing data provided by any one of base stations 106a-c. In other embodiments, processor 302 can exchange data, including control information and instructions with other mobile stations, devices, or functional modules coupled to base stations 106a-c.

Memory 304 may be one or more memory devices that store data as well as software. Memory 304 may also include, for example, one or more of volatile or non volatile semiconductor memories, magnetic storage, or optical storage. In some embodiments, memory 304 may be a portable computer-readable storage media, such as a portable memory cards, including, for example Compact Flash cards (CF cards), Secure Digital cards (SD cards), Multi-Media cards (MMC cards), or Memory Stick cards (MS cards). Portable memory devices may be equipped with a connector plug such as, a Universal Serial Bus (USB) connector or a FireWire® connector for uploading or downloading data and/or media between memory 304 and other devices (not shown).

I/O devices 310 may be one or more of a mouse, stylus, audio input/output device, imaging device, printing device, or other similar device. Interfaces 308 may include external interface ports, such as USB, Ethernet, FireWire®, and wireless communication protocols. Interfaces 308 may also include a graphical user interface. Mobile station 108 may be operatively connected to network 112 via a wired and/or wireless communications link using interface 308.

Transceiver 312 may include any appropriate type of transmitter and receiver to transmit and receive voice and/or data from any one of base stations 106a-c to mobile stations 108a-c and other devices assigned to MBSFN target area 102. In some embodiments, transceiver 312 may include one or a combination of desired functional component(s) and processor(s) to encode/decode, modulate/demodulate, and to perform other wireless communication channel related functions. Transceiver 312 may be coupled to communicate with antenna 310 to receive MBS packets or to transmit and receive voice and/or data in one of various transmission modes. Transmission modes may include, for example, point-to-point (PTP), single-cell point-to-multipoint (SC-PTM), and multi-cell point-to-multipoint (MC-PTM) previously described. Antenna 310 may be a single antenna or an antenna array.

Figure 4:
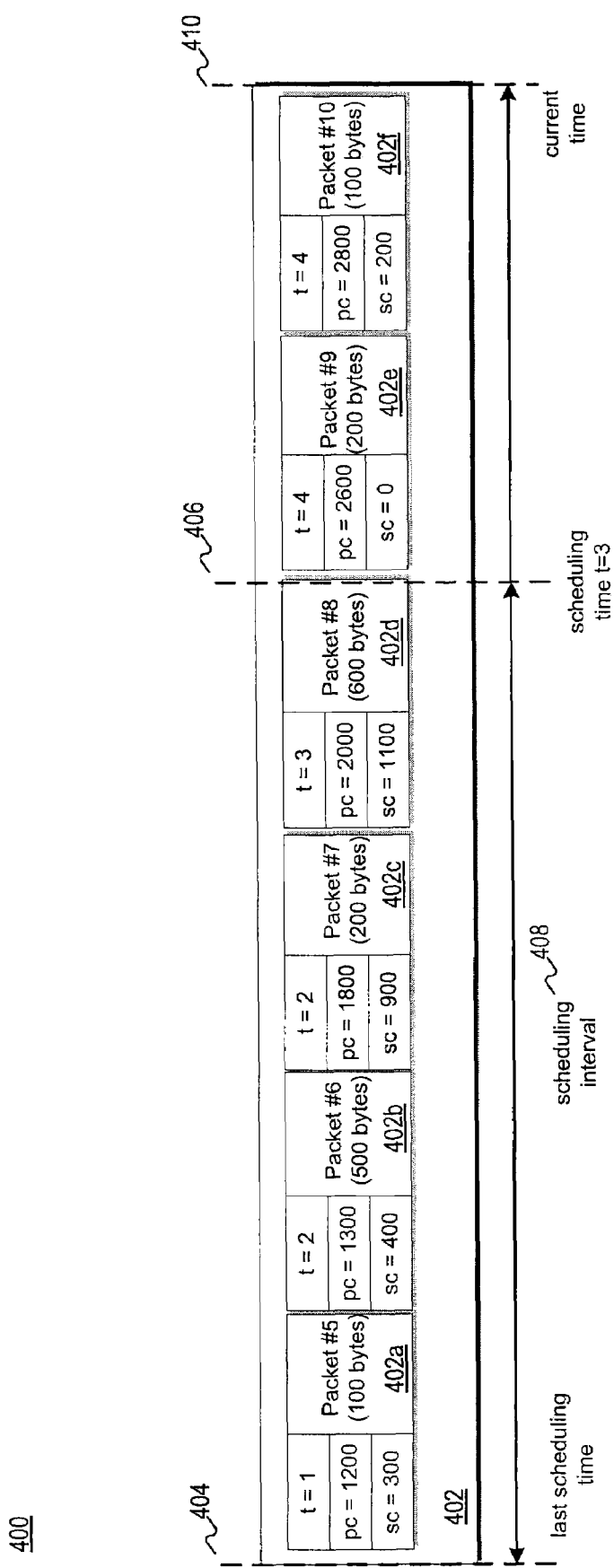
FIG. 4 illustrates a diagram of an exemplary buffer status for an exemplary MBS service consistent with some embodiments.

FIG. 4 illustrates a diagram illustrating an exemplary buffer status or content 400 for an exemplary MBS service consistent with some embodiments. As shown in FIG. 4, buffer 402 may contain logical or physical arrangement of data, which may reside in a region of a computer-readable storage media accessible by any one of base stations 106a-c. For example, in some embodiments, buffer 402 may be memory 204 or a part of it. In other embodiments, buffer 402 may be or belong to a part of another computer-readable storage medium coupled directly or indirectly to processor 202. Data may be stored in buffer 402 temporarily based on control information received and/or processed by processor 202. MBS packets transmitted from MDE 114 and received by any one of base stations 106a-c may be stored temporarily in buffer 402 associated with the respective base station receiving the MBS packets.

Data stored in buffer 402 may be arranged in various manners. For example, in some embodiments, received MBS packets may be arranged based on a timestamp or a primary counter assigned by MDE 114. That is, MBS packets received by MDE 114 may be assigned a timestamp or other meta data indicating or used to derive when the packet was received. Stored in buffer 402, MBS packets having later timestamps may be prioritized for processing over MBS packets having more recent timestamps. In other words, data may be stored in buffer 402 or accessed from buffer 402 using a queue prioritized based on the relative time that a specific MBS packet was received by the respective base station. For example, as shown in FIG. 4, buffer 402 may include MBS packets 402a-f, labeled packet #5 through packet #10, respectively. Packet #5 402a may be the first in the queue, having a timestamp t=1. Packet #10 402f may be the last MBS packet in the queue, having a timestamp t=4 and closest to time demarcation current time 410. Accordingly, packet #5 402a may be processed by processor 202 before packet #10 402f. Processing, consistent with some embodiments, may include one or a combination of modifying and/or moving data stored in buffer 402 to transceiver 214 to transmit MBS packets.

The determination of when to move data stored in buffer 402 to transceiver 214 may be based in part on commands received by processor 202 from MCE 116 and buffer status 400. For example, commands provided by MCE 116 may execute or cause to be executed one or more scheduling algorithms to determine the amount of MBS packets transmitted during scheduling interval 408. Scheduling algorithms may be, but are not limited to, first-come first-served, last-in first-out, priority-based, or other algorithms appropriate to maintain content synchronization. MCE 116 may define scheduling interval 408 bound by scheduling time 406 and last scheduling time 404. MCE 116 may also control radio resource allocation associated with transmitting MBS packets during scheduling interval 408. In some cases, the radio resource capacity may be configured as one or more radio blocks (e.g., MBSFN subframes), each having a pre-determined capacity or bandwidth. For example, a radio resource capacity may be 1200 bytes, comprised of four 300 byte radio resource blocks. Buffer status 400 may be associated with the number of MBS packets received before scheduling time 406. For example, as shown in FIG. 4, buffer status 400 indicate that packet #5 402a through packet #8 402d have timestamps less than or equal to scheduling time 406. Based on buffer status 400, scheduling algorithm, and radio resource allocation, a base station may determine the amount of MBS packets to transmit from buffer 402.

As shown in FIG. 4, MBS packets may also include additional parameters, such as primary counter (pc) and secondary counter (sc). Parameter pc may correspond to the total size or amount of MBS packets that have been sent to one or more base stations participating in an MBSFN transmission. In some cases, the primary counter value may be represented in bits, bytes, or other suitable metrics. Parameter sc may represent the total size or amount of MBS packets having a timestamp greater than the last scheduling time. Like the pc value, the sc value may be represented in bits, bytes, or other suitable metrics. In other embodiments, parameter sc may correspond to other parameters, including the total size of MBS packets having a timestamp that is less than or equal to the last scheduling time.

In operation, parameters sc and pc may be used to determine buffer status 400 at any given time. For example, based on FIG. 4, we can assume packets #0-#4 were transmitted during previous scheduling intervals and deleted from buffer 402. Buffer status 400 thus depicts ten MBS packets received from MDE 114. Each packet in buffer 402 includes parameters t, sc, and pc. For example, the primary and the secondary counter associated with packet #6 402b are 1300 bytes and 400 bytes, respectively. In other words, prior receiving packet #6 402b, 1300 bytes of MBS packets were received, 400 bytes of which have a timestamp greater than last scheduling time 404. Using the information provided by packet #6 402*b*, the primary counter value of 1800 bytes and the secondary counter value of 900 bytes associated with packet #7 402*c* may be derived. Further, as illustrated in FIG. 4, MDE 114 may reset the secondary counter of packet #9 402*e* because its timestamp is greater than current scheduling time 406.

Figure 5:
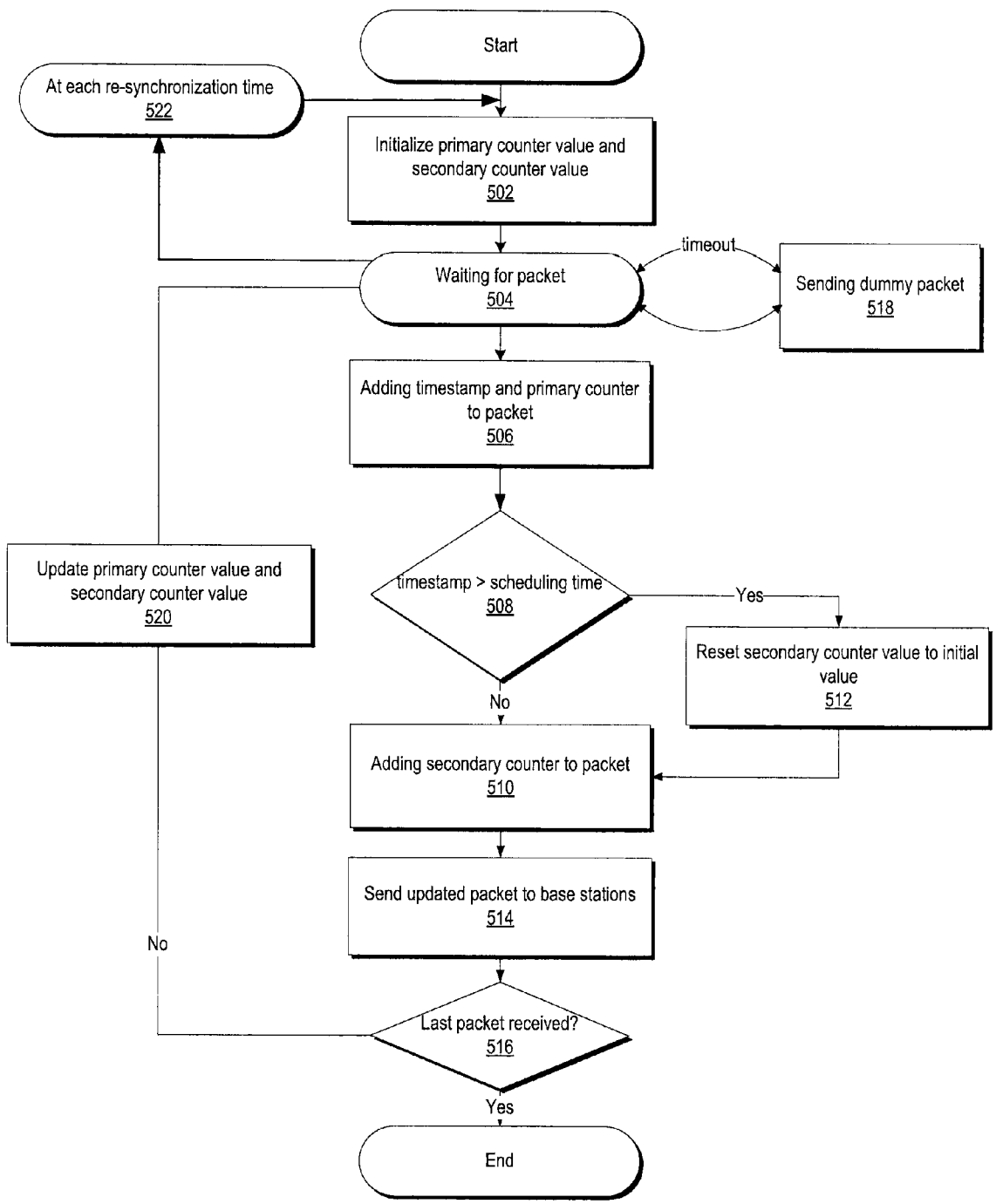
FIG. 5 illustrates a flow chart of an exemplary method for content synchronization in a wireless communication network consistent with some embodiments.

FIG. 5 illustrates an exemplary method 500 for performing content synchronization in a single frequency network. As shown in FIG. 5, in step 502, a primary counter value and a secondary counter value are assigned an initial value. For example, when a MBSFN transmission is set, the initial values of both counters may be set to zero by MDE 114. In step 502, each counter may also be assigned different values based on the specific implementation of the buffer status and capabilities of MDE 114 or MCE 116. Values may be numerical, alpha-numerical, or other values suitable to be used in a counting function.

In step 504, MDE 114 waits to receive MBS packets. If MBS packets are not received by a pre-determined timeout period, MDE 114 may transmit dummy packets to base stations participating in the MBSFN transmission, as describe in step 518. The timeout period may be determined based in part on the scheduling interval. A dummy packet, for example, may contain only parameters pc and sc without data payload. In some embodiments, dummy packets may have a higher transmission and/or scheduling priority than other normal packets in intermediate nodes (e.g., hubs, routers, gateways, etc.) between MDE 114 and one or more of base stations 106*a-c* so that dummy packets may not be blocked when traveling over one or more communication channels. Otherwise, in step 506 a primary counter may be added to the received MBS packet as illustrated in FIG. 4. To improve the robustness of the content synchronization, the primary counter and/or secondary counter may be reset at each re-synchronization time as described in step 522.

In other embodiments, a timestamp may be added to the received packet. Though optional, the timestamp may denote the time that the received MBS packet will be ready for transmission in the base stations participating in the MBSFN transmission. In other words, the timestamp may indicate an available time to transmit the MBS packet from participating base stations to facilitate a time-synchronized transmission. In operation, once the available time has expired, participating base stations may assume all the other related base stations have received the associated MBS packet. Thus, the received packet having an expired available time or timestamp may be scheduled for transmission during the next scheduling interval. For example, as illustrated in FIG. 4, exemplary MBS packets 402*a*, 402*b*, 402*c*, and 402*d* have timestamps of t=1, t=2, t=2, and t=3, respectively. Each of which are less than or equal to scheduling time 406 having a value of t=3. Accordingly, during scheduling interval 408, packets 402*a*, 402*b*, 402*c*, and 402*d* may be available for transmission from buffer 402.

To better ensure time-synchronized transmission, the assigned timestamp may be based in part on the maximum transmission delay between MDE 114 and participating base stations. Alternatively or additionally, the timestamp may be based on one or more of the packet departure time or maximum transmission delay. Packet departure time may be associated with when a MBS packet is transmitted from MDE 114 to any one of base stations 106*a-c*. In some embodiments, the timestamp may be also based on a timeout period to assure that at least one of MBS packets and dummy packet received by any one of base stations 106*a-c* with a timestamp greater than the scheduling time. The timeout period may be consistent with the description provided in step 504. In other embodiments, timestamp may be based on more, fewer, or different parameters. For example, the timestamp may be derived from the packet departure time because other parameters are mostly fixed and may be determined in advance.

In some embodiments, a packet number may be added to a received MBS packet to calculate the number of lost packets. For example, in some cases, the packet number may be used to compensate media access control (MAC)/radio link control (RLC) header overhead.

In step 508, a determination is made concerning whether the received MBS packet added a timestamp greater than the next scheduling time. If the received MBS packet has a timestamp less than or equal to the scheduling time, a secondary counter may be added to the received packet as described in step 510. The secondary counter may be included in some or all MBS packets used in the MBSFN transmission. For example, to reduce overhead, MDE 116 may add the secondary counter to the first r MBS packets received that have a timestamp greater that the last scheduling time, where r may be a positive integer.

If the received MBS packet has a timestamp that is greater that the scheduling time, as described in step 512, the value of the secondary counter may be set to an initial value. Resetting the secondary counter indicates that the received packet is the first packet whose timestamp is greater than the scheduling time. For example, as described in FIG. 4, the value of the secondary counter associated with packet #9 402*e* may be set zero. As shown in FIG. 4, packet #9 402*e* is the first packet received whose timestamp is greater than scheduling time 406. In step 514, the received MBS packets are sent to base stations participating in the MBSFN transmission.

In step 516, a determination may be made concerning whether the received MBS packet is the last packet received over a communication channel. If the received MBS packet is not the last packet received, the primary and the secondary counter may be updated as described in step 520. In step 520, updating the primary counter value may include adding the previous primary counter value to the size of the received MBS packet. Similarly, updating the secondary counter value may include adding the previous secondary counter value to the size of the received MBS packet. After updating the counters, the process may return to step 504, waiting for another received MBS packet and continuing the previously described process. In cases where the received MBS packet is the last packet, the process may be terminated.

Figure 6:
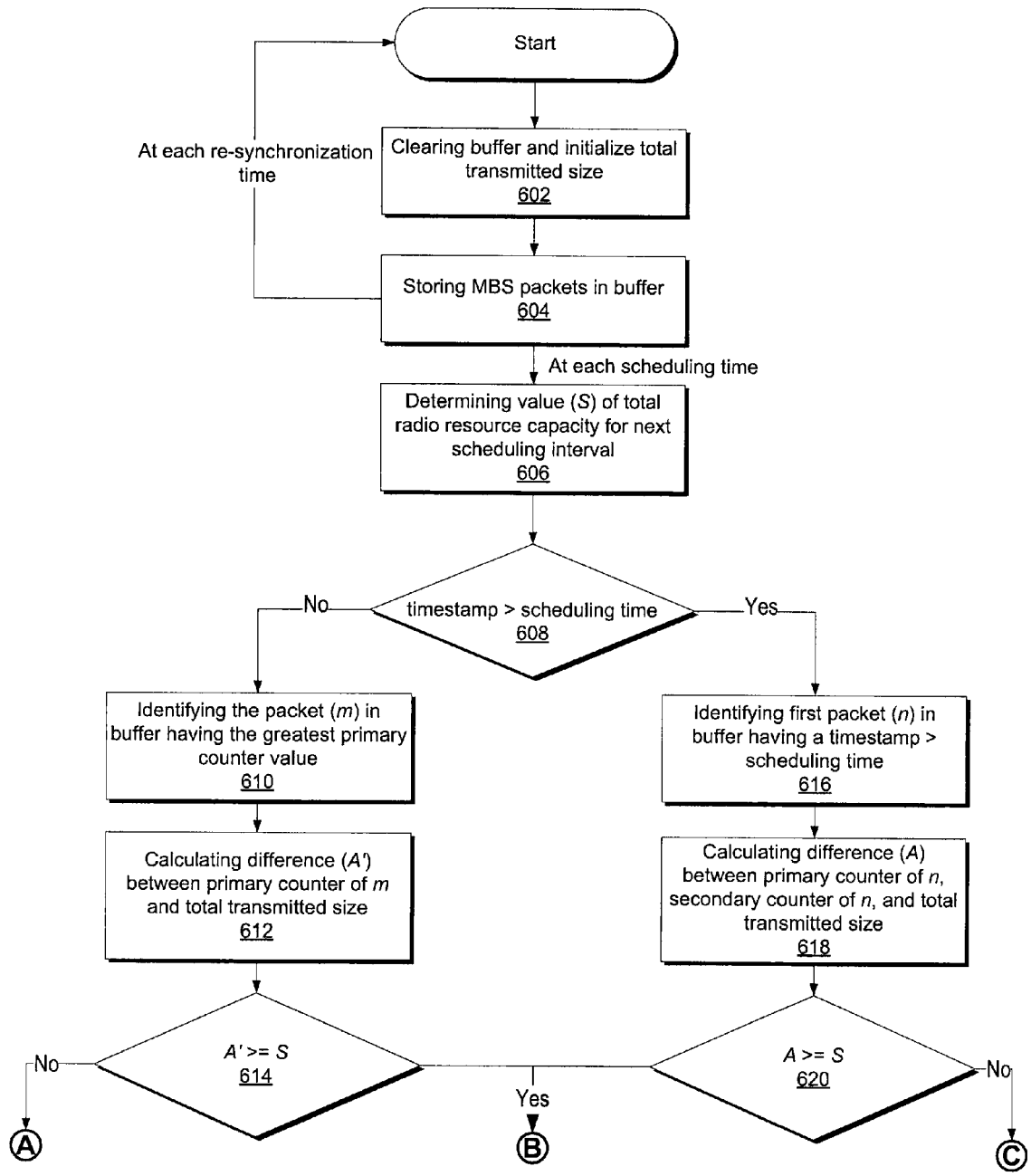
FIGS. 6, 6A, 6B, and 6C illustrate an exemplary method of transmitting time-synchronized content consistent with some embodiments.

FIG. 6 illustrates and exemplary method 600 of transmitting time-synchronized content consistent with some embodiments. In step 602, a buffer configured to receive MBS packets may be cleared of existing data to establish a known buffer status. In operation, processor 202 may execute instructions to clear a region of memory 204 configured to act as the buffer. In step 602, parameters, such as total transmitted size, may be initialized. For example, total transmitted size may be set to zero in response to instructions received by processor 202. In some cases, total transmitted size or similar parameters may be used to determine the total amount of MBS packets that has been transmitted from the buffer of base stations participating in an MBSFN transmission during previous scheduling intervals.

In step 604, received MBS packets may be stored in the buffer. In step 606, a determination of the total radio resource capacity for the next scheduling interval is made. In some embodiments, the total radio resource capacity may be assigned by MCE 116 or other network components suitable to manage resources associated with one or more communication channels associated with the MBSFN transmission.

In step 608, MBS packets are analyzed to determine if there is any packet having the timestamp greater than the scheduling time in the buffer. In operation, this determination may be made by comparing the timestamp associated with received MBS packets and scheduling time provided by MCE 116. If the associated timestamp is greater than the scheduling time, as described in step 616, a first packet (n) stored in the buffer having a timestamp greater than the scheduling time is identified. In some embodiments, as described above, the timestamp may be not added to MBS packets. Even so, the first packet (n) still can be identified by checking the secondary counter, because the value of the secondary counter may be set to an initial value if the MBS packet is the first packet whose timestamp is greater than the scheduling time. In step 618, to determine if there is sufficient radio resource capacity to transmit all MBS packets stored in the buffer having a timestamp less than or equal to the scheduling time, a first difference parameter (A) is calculated. For example, A may represent the differences between primary and secondary counters associated with the first packet (n) and the total transmitted size. In step 620, the first difference parameter A may be compared to the total radio resource capacity, represented by parameter S.

If on the other hand, all associated timestamps of MBS packets in the buffer are less than the scheduling time, as determined in step 608, the packet (m) having the greatest primary counter value in the buffer is identified, as described in step 610. In step 612, to determine if there is sufficient radio resource capacity to transmit all MBS packets stored in the buffer having a timestamp less than or equal to the scheduling time, a second difference parameter (A') is calculated. For example, A' may represent the difference between primary counter associated with the last packet (m) and the total transmitted size. In step 614, the second difference parameter A' may be compared to the total radio resource capacity, represented by parameter S.

Figure 6A:
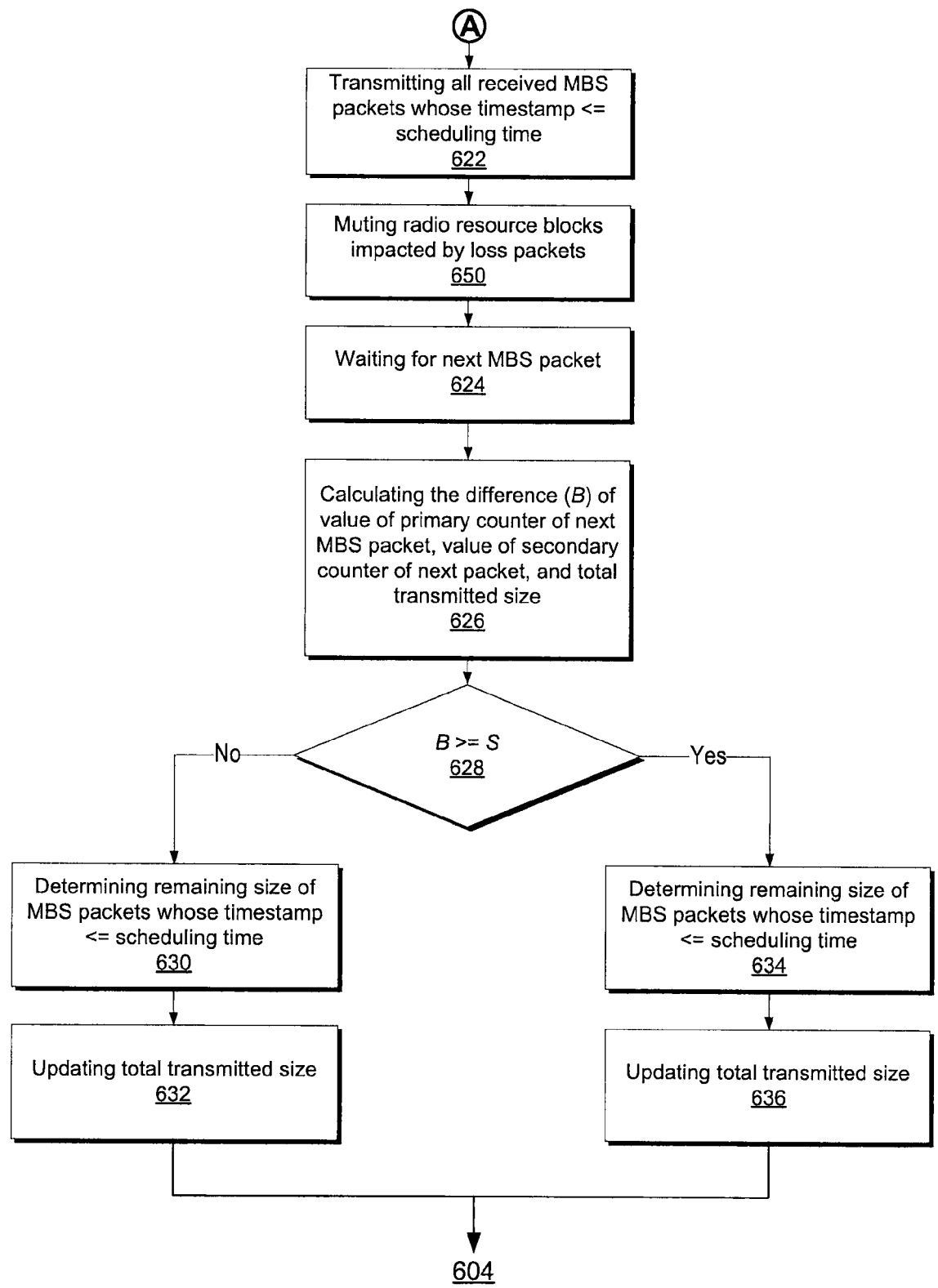

Based on the evaluation performed in step 614, if A' is not greater than or equal to S, step 622 may be performed as illustrated in FIG. 6A. In step 622, all received MBS packets having a timestamp less than or equal to the scheduling time may be transmitted. In some embodiments, step 622 may be performed using one or a combination of processor 202, transceiver 214, antennas 212. In some cases, however, MBS packets may be lost when traveling over one or more communication channels between MDE 114 and one or more of base stations 106a-c. In these cases, the affected base station may be muted during radio resource blocks potentially impacted by the lost MBS packets. By muting impacted radio resource blocks, as performed in step 650, the MBSFN transmission may remain synchronized and able to recover MBSFN transmission from the loss of MBS packets.

At this stage, the process may lose buffer status synchronization with other base stations participating in the MBSFN transmission until the next packet is received, because it may not distinguish whether there is no packet following the packet (m) transmitted from MDE 114 or all of packets following the packet (m) are lost when traveling from MDE 114. Thus, in step 624, the process may wait for another received MBS packet. Upon receiving another MBS packet, in step 626, a third difference parameter (B) may be calculated to determine the buffer status and/or the associated total transmitted size of base stations participating in the MBSFN transmission. In some embodiments, B may represent the differences between primary and secondary counters associated with the additional MBS packet and the total transmitted size. In step 628, the third difference parameter B may be compared to the total radio resource capacity, represented by parameter S. In step 630, a determination may be made that there are no MBS packets having a timestamp less than or equal to the scheduling time remaining in the buffer. That is, there is sufficient radio resource capacity to transmit all MBS packets during the current scheduling interval. In step 632, the total transmitted size may be updated to reflect the total number of bytes associated with the transmitted MBS packets. This total transmitted size, for example, may be updated by adding the number of bytes associated with the transmitted MBS packets during the next scheduling interval. After updating the total transmitted size in step 632, the process returns to step 604.

In step 634, a determination may be made that there are remaining MBS packets having a timestamp less than or equal to the scheduling time. For example, as illustrated in FIG. 4, total radio resource capacity may be 1200 bytes associated with the next scheduling interval. Yet, the total bytes associated with packet #5 402a through packet #8 402d equals 1400 bytes. Thus, 200 bytes of MBS packets remain in buffer 402 for transmission during the next scheduling interval. In step 636, the total transmitted size may be updated to reflect the total number of bytes associated with the transmitted MBS packets. In step 636, updating the total transmitted size may include adding the previous total transmitted size to the size of total radio resource capacity. After updating the total transmitted size in step 636, the process returns to step 604.

Figure 6B:
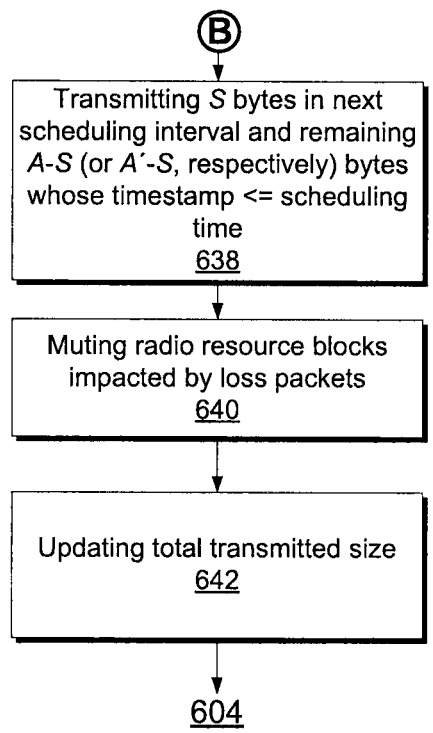

Based on the evaluation performed in step 614 or step 620, if either A or A' is greater than or equal to S, step 638 may be performed as illustrated in FIG. 6B. In step 638, received MBS packets having a timestamp less than or equal to the scheduling time and with a cumulative packet size no greater than the radio resource capacity S may be transmitted. In some cases, however, MBS packets may be lost when traveling over one or more communication channels between MDE 114 and one or more of base stations 106a-c. In these cases, the affected base station may be muted during radio resource blocks potentially impacted by the lost MBS packets. By muting impacted radio resource blocks, as performed in step 640, the MBSFN transmission may remain time-synchronized and able to recover MBSFN transmission from the loss of consecutive MBS packets.

For example, referring to FIG. 4, in some cases packet #6 402b and packet #7 402c may be lost. That is, packet #6 402b and packet #7 402c are not received by one or more of base stations 106a-c. In this case, since the affected base station may expect the primary counter of the packet following packet #5 402a to be 1300 bytes (1200 bytes based on the primary counter of packet #5 402a plus 100 bytes based on the packet size of packet #5 402a). If packet #6 402b and packet #7 402c are lost, packet #8 402d follows packet #5 402a. The primary counter associated with packet #8 402d is 2000 bytes and not 1300 bytes as expected. In turn, the affected base station may detect MBS packets have been lost. To recover from the MBS packet loss, which in this case is a loss of consecutive MBS packets, the base station may derive the amount of packet loss. For example, using the primary counter associated with packet #8 402d, it can be determined that 2000 bytes of MBS packets have been transmitted to the base station since the last re-synchronization time. Based on the primary counter and packet size of packet #5 402a, 1300 bytes of MBS packets have been sent at the time packet #5 402a was received. Thus, the packet loss may be determined by subtracting 2000 from 1300, resulting in a MBS packet loss of 700 bytes. In response, to minimize interruption to the MBSFN transmission, the affected base station may mute the radio resource blocks impacted by the loss of packet #6 402b and packet #7 402c.

In another example, consecutive MBS packet loss may occur where a first lost MBS packet has a timestamp less than or equal to the current scheduling time and a second and consecutive lost MBS packet has a timestamp greater than the current scheduling time. For example, as shown in FIG. 4, lost MBS packets may include packet #8 402d and packet #9 402e. Similar to the previous example, the affected base station may detect that 800 bytes were lost by comparing the primary counter and the packet size of packet #7 402c and the primary counter of packet #10 402f. Using this approach alone, may not be sufficient to recover content synchronization under these particular circumstances because the affected base station is unaware of the timestamp associated with the lost packets. That is, the affected base station is unaware if the timestamp associated with packet #8 402d and/or packet #9 402e exceeds scheduling time 406. To recover content synchronization under these circumstances, the secondary counter of packet #10 402f may be used. For example, the secondary counter of packet #10 402f indicates that there are 200 bytes of MBS packets stored in the buffer whose timestamp exceeds scheduling time 406. Thus, there are 800 bytes–200 bytes, or 600 bytes of MBS packets whose available time is before scheduling time 406. Accordingly, the affected base station may determine that 200 bytes of lost packets has a timestamp exceeding scheduling time 406, thereby recovering content synchronization.

Figure 6C:
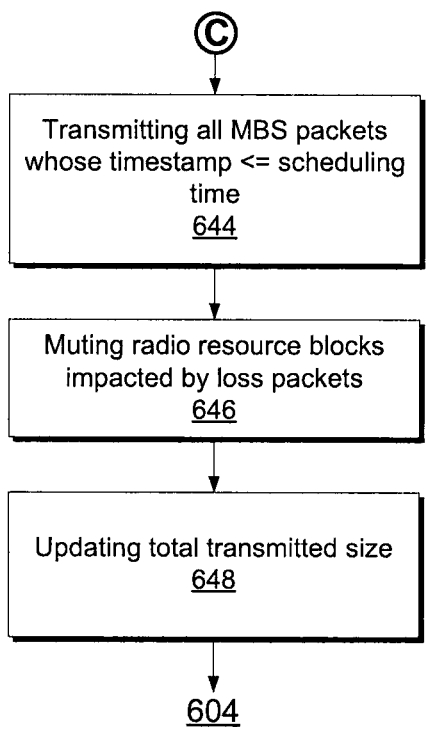

In some embodiments, radio resource blocks may be muted when after a pre-determined timeout period has expired, no MBS packets nor dummy packets have been received. For example, if, as shown in FIG. 4, packet #7 402c-packet #10 402f are not received by one or more base stations 106a-c prior to the expiration of a timeout period, the affected base station(s) may mute the radio resource blocks associated with the MBS packet loss. After the expiration of the timeout period, the MDE may send dummy packets as previously discussed. The dummy packets may include a timestamp value based in part on packet departure time, maximum backhaul delay and timeout, and assure that there is at least one MBS packet or dummy packet received with a timestamp greater than the scheduling time. Thus, the affected base station receiving the dummy packets will be able to maintain content synchronization as previously discussed Step 642 may be performed in a manner similar to that in step 636. Similarly, steps 644-648, as shown in FIG. 6C, may be performed in a manner similar to steps 638-642, respectively. After updating the total transmitted size in steps 648 or 642, the process returns to step 604.

It will be appreciated by those skilled in the art that changes could be made to the disclosed embodiments described above without departing from the broad inventive concept thereof. For example, systems consistent with the disclosed embodiments may have different components or different combinations of components performing similar or the same functions. As another example, methods consistent with the disclosed embodiments may have different sequences or have various combinations of some of the disclosed steps. It is understood, therefore, that the disclosed embodiments are not limited to the particular examples disclosed, but is intended to cover modifications within the spirit and scope of the disclosed embodiments as defined by the claims that follow.

What is claimed is:

1. A method for content synchronization in a wireless network, the method comprising:
   receiving over a first communication channel a first data packet communicated in at least one of a multicast and a broadcast service;
   adding a primary counter value to the first data packet, the primary counter value being indicative of a total size of data packets sent over a second communication channel to a base station within a period of time;
   adding a secondary counter value to the first data packet if the first data packet has a timestamp later than a scheduling time, the scheduling time associated with a scheduling interval for transmitting data packets; and
   sending an updated first data packet that has the first data packet received including the primary counter and the secondary counter over the second communication channel to the base station.

2. The method of claim 1, wherein the wireless network is a single frequency network.

3. The method of claim 1, further comprising:
   updating a primary counter value and a secondary counter value based on a sent updated first data packet;
   receiving a second data packet over the first communication channel;
   adding the primary counter value and a second timestamp to the second data packet;
   adding the secondary counter value to the second data packet; and
   sending an updated second data packet that has the second data packet received including the primary counter, the secondary counter, and the second timestamp over the second communication channel to the base station.

4. The method of claim 3, further comprising:
   resetting the secondary counter value when at least one of the timestamp of the first data packet and the timestamp of the second data packet is later than the scheduling time.

5. The method of claim 3, further comprising:
   sending a dummy packet, if the second data packet is not received before a timeout period, wherein the dummy packet includes at least one of a third timestamp, the primary counter value, and the secondary counter value.

6. The method of claim 3, wherein updating the primary counter value and the secondary counter value comprises adding to the primary counter value and the secondary counter value a packet size indicative of a packet size of a last packet received.

7. The method of claim 1, further comprising:
   adding the timestamp to the first data packet received, the timestamp being indicative of when the first data packet may be transmitted to the base station.

8. The method of claim 7, wherein the timestamp is based on at least one of a data packet departure time, a maximum backhaul delay, and a timeout.

9. The method of claim 1, wherein, the secondary counter value represents a total size of data packets sent over the second communication channel having a timestamp later than a last scheduling time.

10. The method of claim 1, further comprising:
    resetting the primary counter value and the secondary counter value at each re-synchronous time point.

* * * * *